Oct. 6, 1953 W. A. DERR 2,654,805

REMOTE-CONTROL SYSTEM

Filed Oct. 28, 1949 4 Sheets-Sheet 1

WITNESSES:

Robert C Baird

F. V. Giolma

INVENTOR

Willard A. Derr.

BY G. D. Crawford

ATTORNEY

WITNESSES:
Robert C. Baird
F. V. Giolma

INVENTOR
Willard A. Derr.
BY G. D. Crawford
ATTORNEY

WITNESSES:
Robert C. Baird
F. V. Giolma

INVENTOR
Willard A. Derr.
BY G. D. Crawford
ATTORNEY

Oct. 6, 1953 W. A. DERR 2,654,805

REMOTE-CONTROL SYSTEM

Filed Oct. 28, 1949 4 Sheets-Sheet 4

WITNESSES:

Robert C. Baird

F. V. Giolma

INVENTOR

Willard A. Derr.

BY G. D. Crawford

ATTORNEY

Patented Oct. 6, 1953

2,654,805

UNITED STATES PATENT OFFICE 2,654,805

REMOTE-CONTROL SYSTEM

Willard A. Derr, Pittsburgh, Pa., assignor to Westinghouse Electric Corporation, East Pittsburgh, Pa., a corporation of Pennsylvania Application October 28, 1949, Serial No. 124,217

11 Claims. (Cl. 179—2.5)

My invention relates, generally, to remote control systems, and it has reference, in particular, to supervisory control systems.

Generally stated, it is an object of my invention to provide a supervisory control system that is simple and inexpensive to manufacture and reliable and effective in operation.

More specifically, it is an object of my invention to provide, in a supervisory control system, for operating supervisory control equipment over a carrier frequency channel from a dispatching office which is located at a point removed from the carrier frequency channel.

Another object of my invention is to provide, in a supervisory control system, for controlling and supervising equipment at one or more substations over a carrier frequency channel from a dispatching office at a point on a telephone line remote from the carrier channel.

Yet, another object of my invention is to provide, in a multiple station a supervisory control system, for utilizing a carrier frequency channel for connecting several substations with an intermediate station at which signals are relayed to and from a dispatching office over a telephone line.

It is also an object of my invention to provide, in a supervisory control system wherein signals are relayed between a dispatching office and intermediate station over a telephone line and between the intermediate station and a plurality of remote substations over a carrier frequency channel, for operating the carrier transmitter at the intermediate station when a signal originates at the dispatching office and for preventing operation thereof when signals originate at any of the other locations.

One important object of my invention is to provide, in a supervisory control system wherein signals are relayed between a telephone line and a carrier frequency channel with a single frequency, for preventing the transmitter at the intermediate station from locking-in to transmit a continuous carrier.

It is a further object of my invention to provide, in a supervisory control system, for utilizing carrier frequency equipment for transmitting both code signals and communication, and for rendering automatic volume control of the equipment inoperative when code signals are being transmitted.

It is another important object of my invention to provide, in a supervisory control system having a dispatching office located on a telephone line at a point remote from a carrier frequency channel on which the substation is located, for performing all of the functions which are normally performed on the usual type of carrier frequency supervisory control system.

Other objects will, in part, be obvious and will, in part, be explained hereinafter.

In practicing my invention in accordance with one embodiment thereof, supervisory control equipment at a plurality of remote substations is connected by means of carrier frequency equipment operating by carrier frequency over a power line connecting the substations. Supervisory control equipment at the dispatching office situated on a telephone line at a point remote from the power line operates over the telephone line by means of line relays to key a carrier transmitter at an intermediate station. The dispatching office supervisory equipment is operated in response to carrier signals from the remote substations by having a carrier receiver at the intermediate station control the energization of the telephone line to drive the line relays. The carrier receiver at the intermediate station interrupts the keying circuit of the transmitter so as to prevent its operation when signals originate at one of the remote substations. Automatic volume control of the carrier equipment is rendered inoperative during the transmission of code signals so as to insure proper operation of the supervisory control equipment, and is restored to an operative condition when the carrier is applied steadily for conversation.

For a more complete understanding of the nature and scope of my invention, reference may be made to the following detailed description, which may be read in connection with the accompanying drawings in which.

Figure 1:
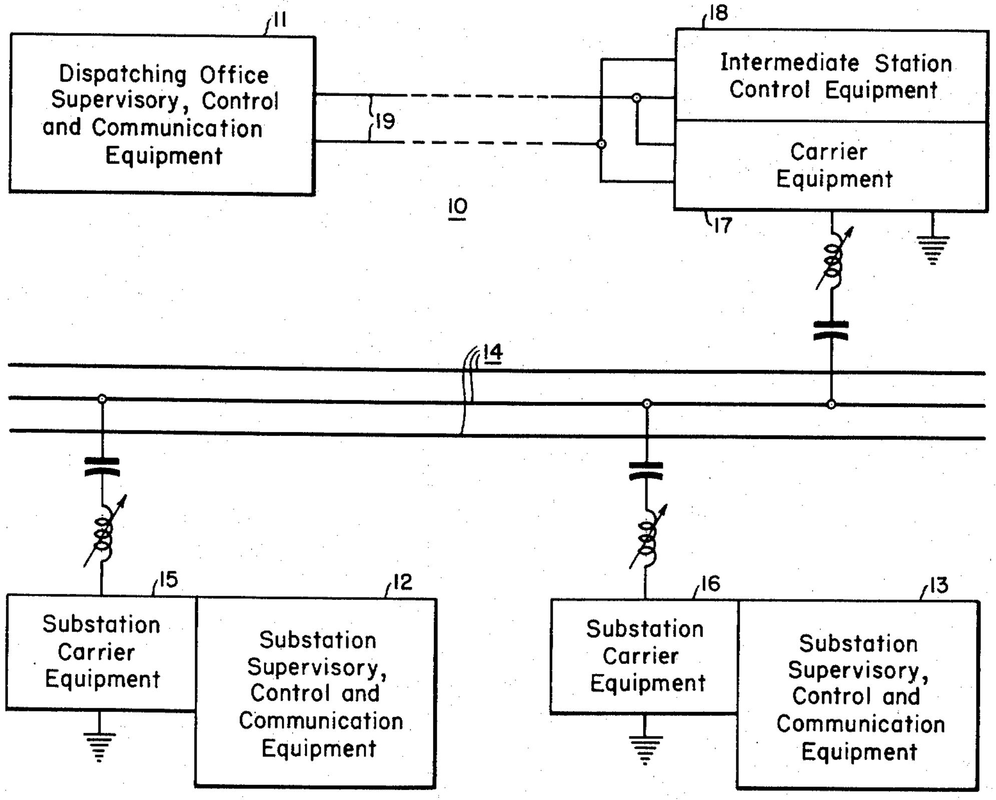
Figure 1 is a schematic diagram of a supervisory control system embodying the invention in one of its forms.

The invention has been illustrated as applied to a supervisory control system of the multiple station type, such as is illustrated and described in detail in Patent No. 2,059,204, issued to H. P.

Boswau on November 3, 1936. Since the supervisory control equipment of the present application is substantially identical in form with that of the system of the Boswau patent, a detailed description of the supervisory control equipment has been omitted in the interests of clarity and simplicity, and only those portions of the Boswau equipment which have been modified are illustrated in detail, together with any and all additional equipment which may have been added for the purposes of the present invention. All equipment, shown in the Boswau patent is designated herein by the same reference characters as in the Boswau patent, and all additional equipment is designated by numerals not appearing in the Boswau patent.

Referring to Fig. 1, the reference numeral 10 may denote, generally, a supervisory control system of the multiple station type wherein supervisory control and communication equipment 11 at a dispatching office is located at a point remote from supervisory control and communication equipments 12 and 13 at remote substations located at spaced points along the conductors of a power line 14.

In order to effect communication, supervision and control functions between the dispatching office equipment 11 and the substation equipments 12 and 13, carrier equipments 15 and 16 may be coupled to the power line 14 at the remote substations for transmitting communication and code impulses at a predetermined carrier frequency. Connection between the dispatching office and the power line 14 may be effected by means of carrier equipment 17 operating on the same frequency as the substation equipments and which may be located at an intermediate station on the power line 14, and transfer or relaying control equipment 18 which may be utilized to operate in conjunction with the carrier equipment 17 and the dispatching office supervisory control and communication equipment 11, over a telephone line 19 extending between the dispatching office and the intermediate station.

Figure 2:
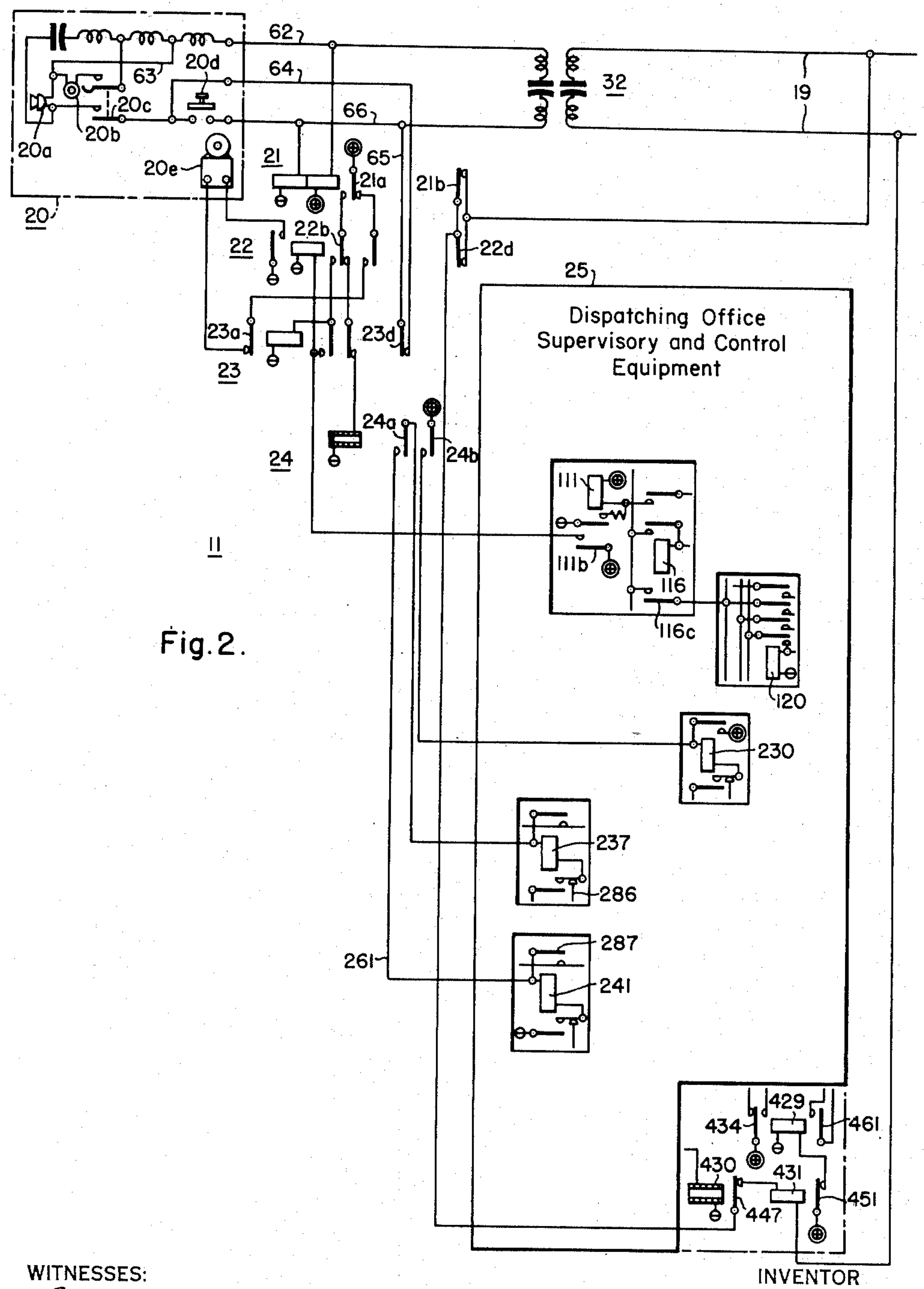
Fig. 2 is a diagrammatic view of the dispatching office, supervisory and control equipment, and communication equipment in the system of Fig. 1.

Referring to Fig. 2 of the drawings, it will be seen that the supervisory control and communication equipment 11 at the dispatching office may comprise telephone equipment 20 which may be connected to the telephone line 19 by means of a repeat coil 32 of a type well known in the art which permits the passage of audio frequencies and blocks the flow of direct current. The telephone equipment 20 may comprise a mouthpiece or transmitter 20*a*, a receiver 20*b* having the usual hook switch 20*c*, a push-to-talk push button switch 20*d*, and a bell 20*e*.

A battery feed relay 21 may be utilized for controlling energization of the telephone line for communication purposes. A ringing relay 22 may be provided in conjunction with a bell cut-off relay 23 for controlling the operation of the bell 20*e*. A phone selection relay 24 may be provided for controlling the dispatching office, supervisory control equipment designated generally by the numeral 25 and comprising generally the equipment shown in Figs. 1 through 4 of Boswau, to select the telephone point at a substation.

From a study of the Boswau Patent 2,059,204, it will be seen that the second point of the supervisory control equipment has been utilized as a telephone point and the point selection relay 230, the group selection relay 237 and the station selection relay 241 have been connected so as to be controlled by the phone selection relay 24, instead of being under the control of an operate key, as shown in the Boswau patent. The individual point selecting relay 116 of the Boswau system has been utilized to provide a connection through armature 116*c* for transmitting the "close" code immediately upon reception of the point selection check code instead of requiring the operation of the master control key, as in the Boswau patent. The point supervisory or lamp relay 111 of the Boswau system has been utilized to provide for energization of the ringing relay 22 upon the receipt of a supervisory code from the remote substation.

Figure 4:
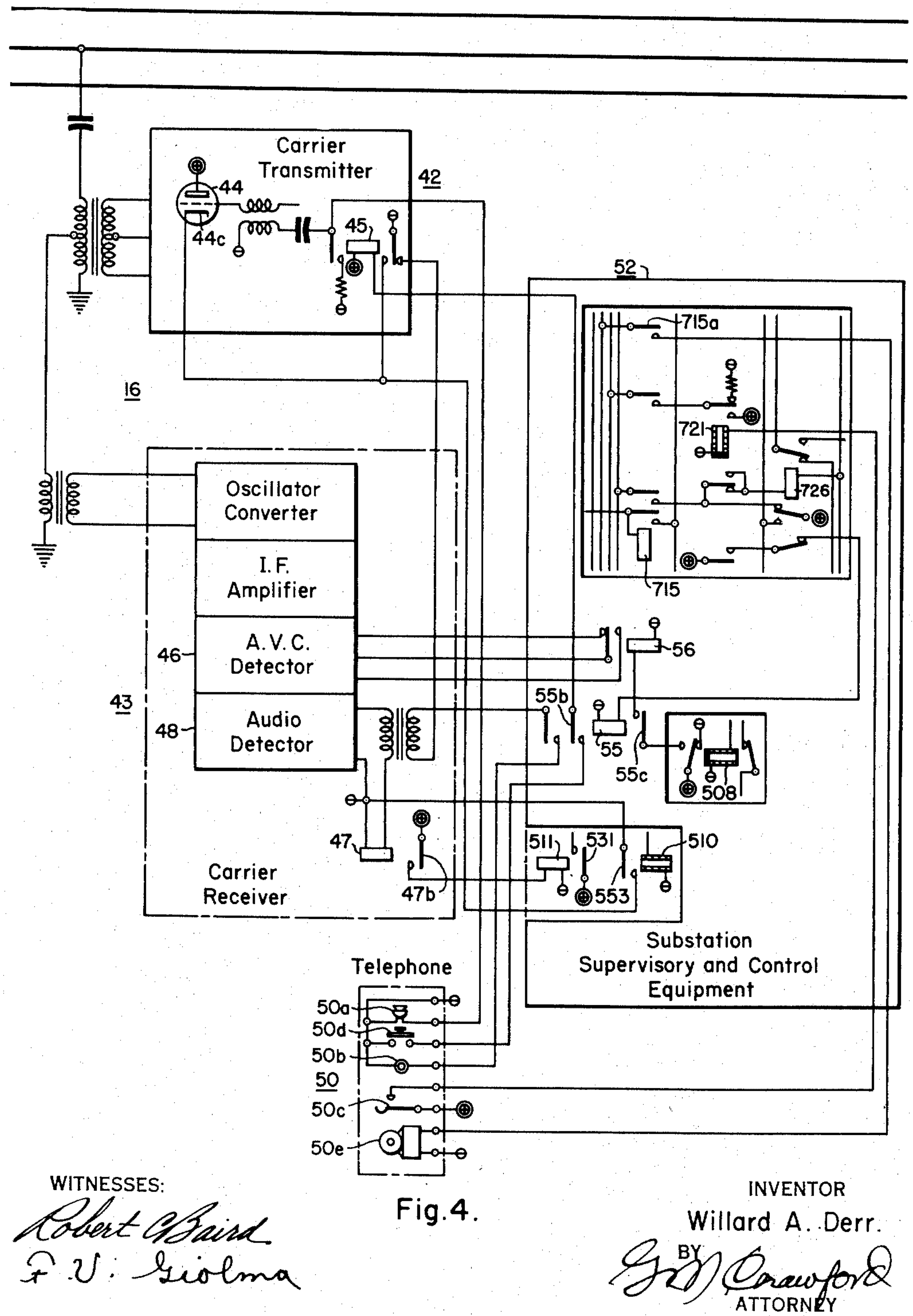
Fig. 4 is a diagrammatic view of the supervisory control, communication and carrier equipment at one of the substations in the system of Fig. 1.

The line circuit of the Boswau system has been changed from a parallel line circuit arrangement to a series circuit arrangement, and the line transfer system shown in the lower portions of Figs. 2 and 4 of the Boswau patent has been omitted in order to simplify the drawings since it does not form any part of the present invention.

Figure 3:
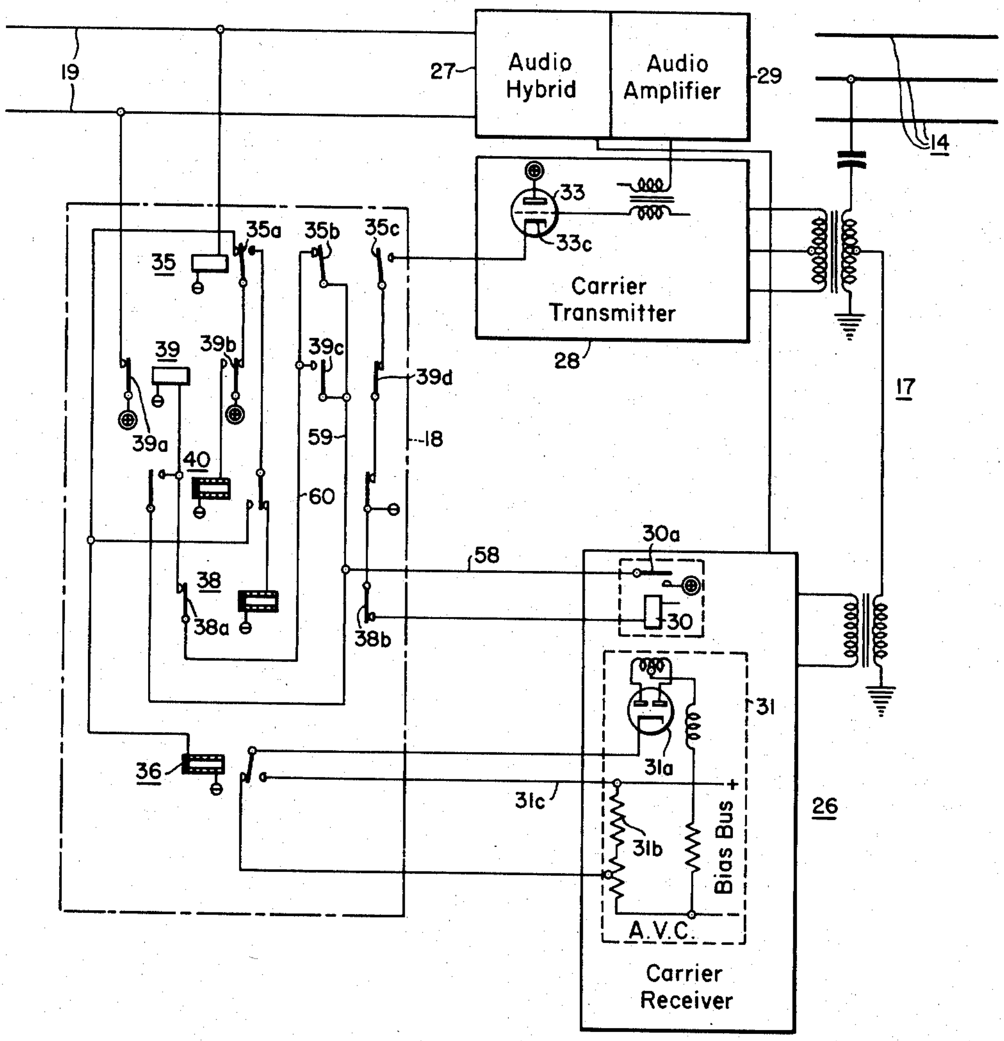
Fig. 3 is a diagrammatic view of the control equipment and carrier equipment at the intermediate station in the system of Fig. 1.

Referring to Fig. 3 of the drawings, it will be seen that the carrier equipment 17 which is coupled to the power line 14 at the intermediate station may comprise, generally, a carrier receiver 26 coupled to the telephone line by the usual audio hybrid 27 and a carrier transmitter 28 coupled to the hybrid through an audio amplifier 29. The receiver 26 may include a receiver relay 30 which operates in response to the receipt of carrier signals, and an automatic volume control circuit 31 including a valve device 31*a* disposed to rectify a portion of an incoming carrier signal and apply a voltage developed across a potentiometer 31*b* to an automatic volume control bias bus 31*c* for limiting the volume of the incoming signal in a manner well known in the art. The carrier transmitter 28 may be of any type well known in the art, including an oscillator tube 33, which may be keyed by controlling the connection of its cathode 33*c* to a source of negative potential.

The control equipment 18 at the intermediate station may comprise a line relay 35, which may be connected to the telephone line conductors 19 in series circuit relation with the line relay 431 at the dispatching office and the necessary control equipment for tying the line relay into the carrier transmitter 28 and carrier receiver 26. The line relay 35 may be disposed to key the carrier transmitter 28 by connecting cathode 33*c* to negative battery through armature 35*c* whenever the relay is deenergized.

In order to provide for removing automatic volume control for the carrier receiver 26 whenever supervisory control operations are being carried out, an AVC cut-out relay 36 of the slow release type may be utilized for rendering the automatic volume control circuit 31 of the receiver inoperative under the control of the line relay 35. Since a single frequency is being used on the carrier channel, a receiver cut-out relay 38, also of the slow release type, may be utilized for interrupting the operating circuit of the receiving relay 30 whenever supervisory and control signals are being received from the dispatching office.

In order to provide for relaying supervisory control signals from the carrier receiver 26 to the dispatching office supervisory and control equipment 25, an auxiliary receiving relay 39 may be utilized for interrupting the energization of the telephone line 19 under the control of the receiving relay 30. To prevent deenergization of the line relay 35 from keying the carrier transmitter 28, as it does when the line relay 35 is deenergized from the dispatching office end of the telephone line, a transmitter cut-out relay 40 of the delayed drop-out type may be utilized. The cut-out relay 40 may be energized upon operation of the auxiliary receiving relay 39 to interrupt the keying circuit for the carrier transmitter 28 and prevent its operation when the line relay 35 drops in response to operation of the auxiliary receiving relay 39.

Referring to Fig. 4 of the drawings, it will be seen that the carrier equipment 16 at any one of the substations may be of any suitable type comprising a carrier transmitter 42 and a carrier receiver 43. The transmitter may include an oscillator tube 44 disposed to be keyed by having its cathode 44c connected to a suitable source of negative potential for coding purposes, and having a keying relay 45 for operating the transmitter for communication purposes. The carrier receiver 43 may be provided with an automatic volume control circuit 46 similar to that described in connection with the carrier equipment 17 at the intermediate station, and a receiving relay 47 disposed to be operated through an audio detector circuit 48 in response to the receipt of carrier signals.

The communication equipment of the supervisory control and communication equipment 13 at the substation may comprise telephone equipment 50 including a mouthpiece or transmitter 50*a*, a receiver 50*b* and an associated hook switch 50*c*, a push-to-talk switch 50*d*, and a telephone bell 50*e*. The mouthpiece and receiver may be connected to the carrier transmitter and receiver, respectively, while the hook switch and bell may be connected through supervisory control equipment 52 for operation in conjunction therewith in a manner which will be described in detail hereinafter.

The supervisory control equipment 52 may be substantially identical with the corresponding equipment shown and described in connection with Figs. 5, 6 and 7 of the Boswau patent hereinbefore referred to. The line circuit, has been changed for effecting carrier frequency operation, so that the line relay 511 is now connected to the station battery by the receiver relay 47 of the carrier receiver. The impulsing relay 510 has been reconnected so as to connect the cathode 44*c* of the oscillator tube 44 to negative through armature 553 and its front contact and produce impulse signals of carrier frequency. The point selection relay 715 has been modified to provide a circuit through armature 715*a* for ringing the bell 50*e*. The point supervision relay 721 has been connected for operation through the hook switch 50*c* instead of through an auxiliary breaker switch, as in the Boswau system.

Additional armatures have been provided on the point supervision relays 721 and 726 for controlling the operation of a carrier control relay 55. An associated AVC cut-off relay 56 has been connected for operation under the control of the sending start relay 508 of the Boswau system which remains in the energized position until a predetermined time after the receipt of the supervisory check code.

Whenever a supervisory or control operation is being performed from the dispatching office, the supervisory control circuit over the telephone line 19 will be interrupted at armature 441 of the impulse sending relay 430, dropping the line relay 431 at the dispatching office in the usual manner, as well as the line relay 35 at the intermediate station. The carrier transmitter 28 at the intermediate station is thereupon keyed over an obvious circuit extending through armature 35*c* of the line relay 35 to transmit corresponding impulses of carrier frequency over the conductors of the power line 14 to the remote substations.

Deenergization of the line relay 35 also provides an obvious energizing circuit for the receiver cut-out relay 38 through armature 35*a* and its back contact. This interrupts the energizing circuit of the carrier receiver relay 30, at armature 38*b*, so as to prevent the carrier receiver from operating and effecting operation of the auxiliary receiving relay 39. The AVC cut-out relay 36 remains in the energized position during impulsing by reason of its slow release characteristic, thus preventing the AVC circuit 31 from being operative.

At each of the substations the carrier receiver 43 operates in response to the receipt of carrier impulses, energizes the line relay 511 through armature 47*b* and its front contact, disconnecting the telephone equipment at its back contact. The supervisory control equipment operates in the well known manner to select the particular point.

When supervisory or control signals originate at any one of the substations, the supervisory control impulse relay 510 keys the carrier transmitter 42 by completing its cathode connection at armature 553. The carrier receiver at the intermediate station operates its receiving relay 30 to provide an energizing circuit for the auxiliary receiving relay 39 extending from a positive to armature 30*a*, conductor 58, conductor 59, armature 35*b*, conductor 60, armature 38*a*, to the operating coil of relay 39.

The auxiliary receiving relay operates and disconnects the telephone line from the battery at armature 39*a*. At the same time it provides an energizing circuit for the cut-out relay 40 at armature 39*b*, and provides a holding circuit for itself through armature 39*c*. It also interrupts the keying circuit for the carrier transmitter 28 at armature 39*d* to prevent even momentary operation of the transmitter. The AVC cut-out relay 36 remains in the energized position during impulsing to render the automatic volume control circuit 31 inoperative. At the dispatching office the line relay 431 is dropped in response to deenergization of the telephone line, thus effecting operation of the supervisory control equipment at the dispatching office in the usual manner.

To select the telephone at a remote substation, the receiver 20*b* may be lifted to close the hook switch 20*c* and provide an energizing circuit for the battery feed relay 21 extending from positive through one section of the operating winding of relay 21, conductor 62, conductor 63, transmitter 20*a*, the hook switch 20*c*, conductor 64, armature 23*d*, conductors 65 and 66 back to the other section of the operating windling of the feed relay and the other side of the station battery. Relay 21 operates providing an obvious energizing circuit for the phone selection relay 24 through armature 21*a* and its front contact. Relay 24 operates and connects the point selecting relay 230, and the group selecting and station selecting relays 237 and 241 for operation through armatures 24*b* and 24*a*, respectively, in a manner similar to that when an operation key is pushed at the dispatching office.

At the termination of the point selection code, the telephone point relay 715 at the substation operates to set up a circuit for the telephone bell 50*e* through armature 715*a*. Point relay 116 at the dispatching office picks up upon receipt of the point selection check code from the substation and provides a connection through armature 116c similar to that provided by the master control key 211 of Boswau, which results in the supervisory control equipment transmitting a "close" code. Receipt of the "close" code places positive battery on the telephone bell 50e at the substation causing it to ring.

When the receiver is lifted at the substation, supervision relay 721 is energized over an obvious circuit extending through the hook switch 50c momentarily interrupting the energizing circuit of relay 726 and causing the "close" supervision code to be sent. This results in the operation of the point supervisory relay 111 at the dispatching office resetting the supervisory equipment with a long pulse in the manner described in detail in the Boswau patent.

Relay 111 provides an obvious energizing circuit for the ringing relay 22 over armature 111b, which completes an energizing circuit for relay 23 through armature 22b and its front contact, and interrupts the energizing circuit for the phone selection relay 24 at the back contact of the armature 22b. Relay 22 also actuates armature 22d to set up a carrier control circuit over the telephone line 19.

At the substation the point relay 715 returns to the deenergized position, stopping ringing of the bell. Relay 726 is restored to the energized position and control relay 55 picks up providing an obvious circuit over armature 55c, for AVC cut-off relay 56 which picks up to render AVC effective when supervisory control relay 508 resets after the reset pulse.

Energization of the bell cut-off relay 23 interrupted the operating circuit of the battery feed relay 21 at armature 23d. When the operator at the dispatching office wishes to talk, he operates the push-to-talk switch 20d, thereby completing an energizing circuit for the battery feed relay 21 and interrupting the series line circuit between the dispatching office and the intermediate station at armature 21b. This drops the line relays 431 and 35 so as to key the carrier transmitter for conversation. Since the push-to-talk switch will be held down during conversation, the AVC cut-out relay 36 returns to the deenergized position after a predetermined time to render the automatic volume control circuit 31 operative.

When the operator at the substation wishes to talk, he operates the push-to-talk switch 50d, keying the carrier transmitter for conversation by operating the keying relay 45 through armature 55b. Receipt of carrier at the intermediate station results in operation of the receiver relay 30 and the auxiliary receiving relay 39. The battery is thereupon removed from the telephone line 19, and the line relays 431 and 35 are deenergized.

After a predetermined time, the AVC cut-out relay 36 returns to the deenergized position, restoring the automatic volume control circuit 31 to an operative condition. At the remote substation, the sending start relay 508 returned to the deenergized position a predetermined time after the supervision code was terminated and provided an obvious energizing circuit for the AVC cut-out relay 56, thus rendering the automatic volume control operative at the substation.

When the operator at the dispatching office hangs up his receiver, the operating circuit for the battery feed relay 21 is interrupted at the hook switch 20c. Relays 22 and 23 are still held up by reason of point supervisory relay 111 being energized. When the operator at the substation hangs up, relay 721 of the supervisory equipment is deenergized and the energizing circuit for the point supervisory relay 726 is again momentarily interrupted. Station and group selection and check codes are thereupon transmitted in the usual manner, as is the point selection code which results in point selecting relay 116 at the dispatching office picking up to start the transmission of the point selection check code. Upon receipt of the check code at the substation, relay 715 picks up and the "open" supervision code is sent which results in the point supervisory relay 111 at the dispatching office returning to the deenergized position. The supervisory control equipment is thereupon reset and relays 22 and 23 at the dispatching office return to the deenergized position. Relays 55 and 56 of the substation are also released by deenergization of relay 726, and the equipment is returned to normal.

When a call originates at the substation, picking up the receiver results in completing a circuit for the point supervision relay 721 through the hook switch 50c. The point supervision relay 726 is momentarily deenergized, and results in sending the group, station and point selection codes.

At the dispatching office, relay 116 is picked up in response to receipt of the point selection code and initiates sending of the point selection check code. Upon receipt of the point selection check code, relay 715 at the substation operates and the "trip" supervisory code is transmitted resulting in operation of the point supervision relay 111, which provides an obvious energizing circuit for the ringing relay 22 for connecting the bell 20e to the station battery.

When the operator at the dispatching office lifts his receiver. an energizing circuit is set up for the battery feed relay 21. This completes an obvious energizing circuit for cut-off relay 23, which interrupts the energizing circuit of ringing relay 22 at armature 23a to stop the bell. When the push-to-talk switch is actuated, the carrier is placed on the carrier channel at the intermediate station in the manner hereinbefore described for carrying on conversation.

From the above description and accompanying drawings, it will be apparent that I have provided in a simple and effective manner for operating supervisory and control equipment at one or more remote substations from a dispatching office over a pair of discontinuous signal channels, for example, a carrier channel connecting the substations, and a telephone intension. By utilizing an intermediate station with repeat equipment between the carrier equipment and telephone equipment, a simple and effective supervisory control and communication system is provided which prevents the possibility of lockout of the carrier equipment even though a single frequency is used. Provision for selective push-to-talk communication is provided with only a single pair of telephone wires available at the dispatching office. Control of the carrier equipment is provided so that the AVC circuit is cut into operation only for communication, thus preventing any interference with operation of supervisory control equipment. The supervisory control equipment is not locked out during communication, the supervisory control equipment being used only for selecting the desired telephone point.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. In a supervisory control system, a telephone line, dispatching office impulse signal sending and receiving equipment said equipment including a line relay, circuit means connecting the line relay to the telephone line, impulse means having contact means connected in circuit with the line and the line relay to apply impulse signals to the line in response to operation of the supervisory equipment, remote substation supervisory control impulse signal sending and receiving equipment including carrier frequency receiving and transmitting means, a carrier frequency signal channel, circuit means connecting the carrier receiving and transmitting means respectively to the signal channel to operate in response to carrier impulses of one frequency and to produce carrier frequency impulses in response to operation of said additional supervisory equipment, additional carrier frequency receiving and transmitting means operating on the same frequency, circuit means connecting said additional carrier frequency means to the signal channel at an intermediate station, said additional carrier receiving means including a receiving relay and a keying circuit for the additional transmitting means respectively, a line relay at the intermediate station, circuit means connecting the line relay in circuit relation with the telephone line and the line relay at the dispatching office to effect completion of the keying circuit, control means at the intermediate station including an impulse relay having contact means operable in response to operation of the receiving relay at the intermediate station, and circuit means connecting the contact means of said impulse relay to the telephone line to produce impulse signals to provide for energization of the telephone line and effect operation of the line relay at the dispatching office.

2. The combination in a relaying system of, a carrier channel, carrier frequency equipment connected to the carrier channel including a carrier frequency receiver, a receiving relay, a carrier frequency transmitter, circuit means connecting the receiving relay to the carrier frequency receiver to operate in response to carrier frequency impulse signals on the carrier channel, and a keying circuit connecting the carrier frequency transmitter to a source of electrical energy to effect operation thereof to transmit carrier frequency impulse signals to the carrier channel, a metallic signal line, a line relay having a contact connected in the keying circuit, circuit means connecting the line relay to the line to operate in response to direct current impulses on said line to complete said keying circuit, relay means having a contact connected in circuit with the receiving relay, and circuit means connecting the relay means to effect operation thereof in response to operation of the line relay to render the carrier receiving relay inoperative.

3. In a supervisory control system having a dispatching office and a remote substation; two discontinuous signal channels; said substation having supervisory control and carrier frequency equipment connected to one of said channels to operate by means of carrier frequency impulses over said one of the channels, and said dispatching office having supervisory control equipment connected to the other channel to operate over the other channel by means of direct current impulse signals; relay means at a point intermediate the office and substation including carrier frequency equipment connected to said one of the channels, said equipment including a receiver and a transmitter, a receiver relay connected to be operated by the receiver and a keying circuit connected to key the transmitter, a line relay, circuit means connecting the line relay to the other of said channels for effecting completion of the keying circuit in response to a direct current signal impulse from the dispatching office, auxiliary receiver relay means, circuit means connecting the auxiliary relay means to the receiver relay to operate in response to operation of the receiver relay to apply direct current impulse signals to the other channel, and means including contact means operable in response to operation of the auxiliary receiving relay connected in the keying circuit to interrupt the keying circuit.

4. In a supervisory control system, discontinuous direct wire and carrier frequency signal channels, transfer equipment between said channels comprising, carrier frequency equipment including a receiver having an automatic volume control and a receiving relay, and a transmitter having a keying circuit, said receiver and transmitter being connected to said carrier frequency channel, a line relay, circuit means connecting the line relay to the direct wire channel to operate in response to impulse signals from said direct wire channel, circuit means connected to complete the keying circuit in response to operation of the line relay, slow release relay means, and circuit means connecting the slow release relay means to operate in response to operation of the line relay to render the automatic volume control inoperative for more than the duration of normal impulse signal period after the line relay ceases to operate.

5. A transfer station comprising, terminal means for connection to one signal channel, additional terminal means disposed for connection to another signal channel, carrier frequency equipment including receiving means connected to the first-mentioned terminal means operable in response to a carrier frequency signal applied to the terminal means for said one channel and carrier frequency transmitting means operable to produce carrier frequency impulses of the same frequency, control means including a line relay, circuit means connecting the line relay and the transmitting means, additional circuit means connecting the line relay to one of the additional terminal means for effecting operation of the transmitting means in response to impulse signals from the terminal means of the other signal channel, impulse means and circuit means connecting the impulse means to one of the additional terminal means to produce impulse signals at the additional terminal means in response to operation of the receiving means.

6. In a signal system, terminal means for connection to a direct wire circuit, additional terminal means for connection to a carrier frequency circuit, relaying means comprising carrier frequency receiving and transmitting equipment connected to the additional terminal means including a receiving relay connected to be operated by the receiving equipment and a keying circuit connected to operate the transmitting equipment on the same carrier frequency, a line relay, circuit means connecting the line relay to the direct wire circuit terminals to operate in response to direct current impulse signals, circuit means including contacts operated in response to operation of the line relay connected to complete the keying circuit in response to operation of the line relay, additional circuit means connecting one of the direct wire terminals to a source of electrical energy including relay means operable in response to operation of the receiving relay for operating the line relay, and circuit means including slow release relay means operable to render the receiving relay inoperative when the line relay operates.

7. In a relay system for a supervisory control system, a signal channel, another signal channel, transfer means operatively connecting said signal channel and said another signal channel including a receiver and transmitter, circuit means connecting the transmitter to said another channel and the receiver to said another channel to be responsive to impulse signals on said another channel, a line relay, circuit means connecting the line relay to said one signal channel to be responsive to impulse signals over said one signal channel, circuit means including said line relay operable to key the transmitter and render the receiver inoperative.

8. In combination in a supervisory control system, telephone equipment at each of a dispatching office and a remote substation, a communication channel comprising in part a telephone line from the dispatching office and in part a power line from the remote substation, both said lines extending to an intermediate station, supervisory control equipment at the dispatching office including impulse sending and receiving relays, circuit means connecting the sending and receiving relays of the supervisory control equipment to the telephone line, said supervisory control equipment having a plurality of control points including one for selecting the telephone equipment at the substation, supervisory control and carrier frequency equipment at the remote station, circuit means for connecting said equipment at the remote station to the power line to operate by carrier frequency signals of a single frequency over the power line, carrier frequency equipment connected to the power line at the intermediate station, circuit means connecting the equipment at the intermediate station to the telephone line and the power line to complete a telephone connection between the telephone line and power line, said carrier equipment having automatic volume control, a line relay, circuit means connecting the line relay to the telephone line and to the carrier equipment to effect operation of the carrier equipment in response to impulse signals from the dispatching office, relay means, circuit means connecting said relay means to the telephone line to transmit direct current impulse signals to the dispatching office over the telephone line in response to carrier frequency signals from the remote substation, and circuit means including a slow release relay connected to remain energized during operation of the relay means and render the automatic volume control inoperative.

9. In combination, telephone equipment at a remote substation, carrier frequency transmitting and receiving equipment having an automatic volume control circuit, supervisory control equipment at the remote substation including a telephone control point having circuit means connecting the equipment to the carrier frequency equipment to be operable in response to selection of a telephone point through the supervisory control equipment, switch means operable to render the automatic volume control inoperative, and circuit means connecting the switch means for operating it during selection of the telephone point, said circuit means including a start relay of the supervisory control equipment for rendering the switch means effective to render the automatic volume control operative only after the supervisory control equipment is reset following a selection of the telephone point.

10. In a supervisory control system, telephone equipment of the push-to-talk switch type at a dispatching office, a telephone line connected to the telephone equipment, carrier frequency equipment including a transmitter and receiver at an intermediate station, a carrier frequency channel, circuit means connecting the transmitter and receiver to the carrier channel for transmitting conversation from telephone equipment at the remote substation and the intermediate station through carrier equipment, a line relay, circuit means connecting the line relay to the telephone line at the intermediate station to render the carrier transmitter inoperative, relay means at the dispatching office, and circuit means connecting said relay means to the telephone line for normally connecting the telephone line to a source of electrical energy, said relay means being operable in response to operation of said push-to-talk switch to effect deenergization of the telephone line.

11. In a multiple station type of supervisory control system, supervisory control equipment at each of a plurality of substations, a common carrier frequency signal channel, circuit means including carrier receiving and transmitting equipments connecting said equipments to said channel for operation over the carrier channel by said carrier transmitting and receiving equipments operating on a common frequency, supervisory control equipment at a dispatching office including a line relay, a metallic circuit, circuit means connecting the line relay to the metallic circuit, impulse means, circuit means connecting the impulse means to the metallic circuit to effect energization thereof from the dispatching office, intermediate station carrier frequency transmitting and receiving equipment including a transmitter keying circuit and a receiving relay, circuit means connecting the intermediate station carrier frequency equipments to the carrier channel, circuit means connecting the additional line relay to the metallic circuit to complete said keying circuit, an auxiliary receiving relay, and circuit means including the auxiliary receiving relay connecting the metallic circuit to a source of electrical energy in response to operation of said carrier receiving relay.

WILLARD A. DERR.

References Cited in the file of this patent

UNITED STATES PATENTS

| Number | Name | Date |
|---|---|---|
| 1,746,808 | Wolfe | Feb. 11, 1930 |
| 1,934,423 | Green | Nov. 7, 1933 |
| 2,469,555 | Hitchcock | May 10, 1949 |